United States Patent
McCluskey et al.

(10) Patent No.: US 6,598,884 B1
(45) Date of Patent: Jul. 29, 2003

(54) METHOD AND APPARATUS FOR ADJUSTING A COLLET IN A MACHINE TOOL

(75) Inventors: Patrick John McCluskey, Burwood (AU); Anatoly Kaganov, Elsternwick (AU)

(73) Assignee: Anca Pty. Ltd., Bayswater North (AU)

( * ) Notice: Subject to any disclaimer, the term of this patent is extended or adjusted under 35 U.S.C. 154(b) by 0 days.

(21) Appl. No.: 09/763,811

(22) PCT Filed: Aug. 24, 1999

(86) PCT No.: PCT/AU99/00683

§ 371 (c)(1),
(2), (4) Date: Jun. 5, 2001

(87) PCT Pub. No.: WO00/13069

PCT Pub. Date: Mar. 9, 2000

(30) Foreign Application Priority Data

Aug. 27, 1998 (AU) .............................................. PP5530

(51) Int. Cl.[7] .............................................. B23B 31/20
(52) U.S. Cl. ...................................................... 279/51
(58) Field of Search .................... 279/51, 133; 82/170; 33/638, 639, 641, 642

(56) References Cited

U.S. PATENT DOCUMENTS

| | | | | |
|---|---|---|---|---|
| 4,856,797 A | * | 8/1989 | Rall | 279/147 |
| 4,884,821 A | * | 12/1989 | Dietrich | 279/143 |
| 4,943,071 A | | 7/1990 | Srebot et al. | |
| 5,193,825 A | * | 3/1993 | Kanaan et al. | 279/133 |
| 5,286,042 A | * | 2/1994 | Laube | 279/133 |
| 5,456,146 A | * | 10/1995 | Hubbard et al. | 279/133 |
| 6,123,341 A | * | 9/2000 | Oki et al. | 279/127 |

FOREIGN PATENT DOCUMENTS

| | | | | |
|---|---|---|---|---|
| DE | 219 964 | | 3/1985 | |
| DE | 219964 | * | 3/1985 | 279/51 |
| EP | 265621 | * | 5/1988 | 279/133 |
| FR | 2242196 | * | 3/1975 | 279/51 |
| GB | 2 110 127 | | 11/1982 | |
| GB | 2110127 | * | 6/1983 | 279/133 |
| SU | 1636137 | * | 3/1991 | 279/133 |

* cited by examiner

Primary Examiner—Raleigh W. Chiu
(74) Attorney, Agent, or Firm—Andrus, Sceales, Starke & Sawall, LLP

(57) ABSTRACT

A collet adaptor and method is provided for adjusting a collet (2) in a machine tool. The collet adaptor has a body or arbor (10) with a cylindrical bore (14) for receiving a cylindrical portion (20) of the collet (2) and a tapered surface (18) at its front end for engagement with a tapered split head (21) portion of the collet (2). An anti-rotation screw (40) prevents rotation of the collet (2) relative to the collet arbor (10). The collet arbor (10) has an accurately ground planar rear surface (5) which is bolted to a planar front face (6) of the headstock (4) of a rotatable spindle so as to correct for errors in concentricity. The collet adaptor also includes a plurality of adjustment pins (51) engageable with the cylindrical portion (20) of the collet (2) at circumferentially spaced locations around the collet which provide a fine adjustment to compensate for errors in angularity between the angle of the central longitudinal axis of the collet (2) and the central longitudinal axis of the collet adaptor (10).

22 Claims, 2 Drawing Sheets

METHOD AND APPARATUS FOR ADJUSTING A COLLET IN A MACHINE TOOL

CROSS REFERENCE TO RELATED APPLICATION

The present application is the U.S. national stage application of International Application PCT/AU99/00683, filed Aug. 24, 1999, which international application was published on Mar. 2, 2000 as International Publication WO 00/13069 in the English language. The International Application claims the priority of Australian Patent Application PP 5530, filed Aug. 27, 1998.

BACKGROUND OF THE INVENTION

This invention relates to machines tools and particularly relates to a method of and apparatus for adjusting a collet in a machine tool, such as a computer numerically controlled (CNC) tool cutting and grinding machine.

In CNC tool cutting and grinding machines there are several sources of error which can result in an inaccurately ground workpiece. This invention is principally concerned with compensating for possible runout error in a workpiece held by and extending from a split, draw-back collet.

Conventionally, a split, draw-back collet in a CNC tool cutting and grinding machine has a cylindrical part received in a bore in a collet adaptor or arbor mounted to a rotatable spindle, the collet having a split part at its front end with gripping jaws and a tapered external surface engageable with a complementary tapered surface on the collet adaptor. The collet has a screw-threaded rear end engageable with a complementary screw-threaded front portion of a drawbar extending rearwardly from within the collet adaptor such that when the drawbar is moved rearwardly relative to the collet adaptor, the engagement of the tapered surfaces causes the gripping jaws to tighten on the workpiece to clamp the workpiece securely. This type of collet adaptor, however, can suffer from runout errors of concentricity and angularity. Errors in concentricity occur when the central longitudinal axis of the collet and workpiece is offset from the central axis of the rotatable spindle, and errors in angularity occur when the central longitudinal axis of the collet and clamped workpiece extends at an angle, albeit slight, to the central axis of the rotatable spindle.

It is therefore desirable to provide a method of and apparatus for compensating for runout errors in a split draw-back collet.

It is also desirable to provide an improved collet adaptor which includes an effective means for compensating for errors in runout, particularly errors in angularity.

SUMMARY OF THE INVENTION

According to one aspect of the invention, there is provided a collet adaptor for a split, draw-back collet having a cylindrical part for mounting in the collet adaptor and a tapered split part at its front end for gripping a workpiece, the collet adaptor comprising:

a body with a cylindrical bore for receiving the cylindrical part of the collet and a tapered surface at the front end of the adaptor for engagement with the tapered, split part of the collet; and anti-rotation means for preventing rotation of the collet relative to the collet adaptor, wherein the collet adaptor includes a plurality of adjustment pins engageable with the cylindrical part of the collet at circumferentially spaced locations around the collet to provide a fine adjustment of the angle of the central longitudinal axis of the collet relative to the central longitudinal axis of the collet adaptor.

Preferably, the adjustment pins are spring-loaded and are movable in a substantially radial direction relative to the central axis of the collet adaptor. In a particularly preferred embodiment, each adjustment pin has an enlarged head with a curved surface engaged by a cam surface of an elongate adjustment member which is movable relative to the collet adaptor in a longitudinal direction substantially parallel to the central longitudinal axis of the collet adaptor. Preferably, each elongate adjustment member has a curved end portion engaged by a tapered surface on an adjustable element in the form of an adjustment screw which is radially movable relative to the central longitudinal axis. Thus, a radial movement of the adjustment screw is translated to a longitudinal movement of the elongate adjustment member which, in turn is translated to a fine radial movement of the adjustment pin. Such an arrangement enables a very fine micro adjustment of the angularity of the central longitudinal axis of the collet relative to the central longitudinal axis of the collet adaptor.

The body of the collet adaptor preferably has a recess in its rear end adapted to receive the front end portion of a drawbar to which the rear part of the collet is attachable. In order to permit very fine micro adjustments of the adjustment pins, the drawbar preferably has a flexible elongate intermediate portion between its front end portion and an enlarged rear end portion.

Conventional collet adaptors usually have a frusto-conical rear end portion which is mounted to the headstock of a rotatable spindle by being received in an internally tapered recess in the headstock. This can lead to errors in both concentricity and angularity which are added to similar magnitudes of error in the collet adaptor.

In order to reduce errors caused by the mounting of the collet adaptor to the headstock, the collet adaptor of the present invention preferably has an accurately ground planar rear face which is mounted to an accurately ground planar front face of the spindle headstock. With such a collet adaptor it is possible to substantially eliminate errors in concentricity by using an indicator to indicate the central axis of a clamped workpiece at the front end of the collet and by radially adjusting the position of the collet adaptor to zero the indicator with respect to the central longitudinal axis of the spindle.

According to another aspect of the invention, there is provided a method of compensating for runout errors in a CNC machine having a spindle rotatable about its central longitudinal axis, a collet adaptor, and a split draw-back collet having a cylindrical part mounted in the collet adaptor and a tapered split part at its font end for gripping a workpiece, said method including:

providing the collet adaptor with an accurately ground planar rear surface, an internal tapered surface at its front end, a cylindrical bore to receive the cylindrical part of a collet, anti-rotation means to prevent rotation of the collet relative to the adaptor, and a plurality of adjustment pins engageable with the cylindrical part of the collet;

mounting the collet adaptor and collet to the headstock of a rotatable spindle with the planar rear surface of the collet adaptor adjacent an accurately ground front surface of the spindle headstock;

clamping a workpiece in the collet;

adjusting the radial position of the collet adaptor and collet relative to the central longitudinal axis of the spindle to compensate for errors in concentricity between the central longitudinal axis of the spindle and the central longitudinal axis of the internal tapered surface of the collet adaptor; and adjusting one or more of said adjustment pins to compensate for errors in angularity between the central longitudinal axis of the workpiece clamped by the collet and the central longitudinal axis of the spindle.

BRIEF DESCRIPTION OF THE SEVERAL VIEWS OF THE DRAWING

A preferred embodiment of the present invention will now be described, by way of example only, with reference to the accompanying drawings, in which.

DETAILED DESCRIPTION OF THE INVENTION

Figure 1:
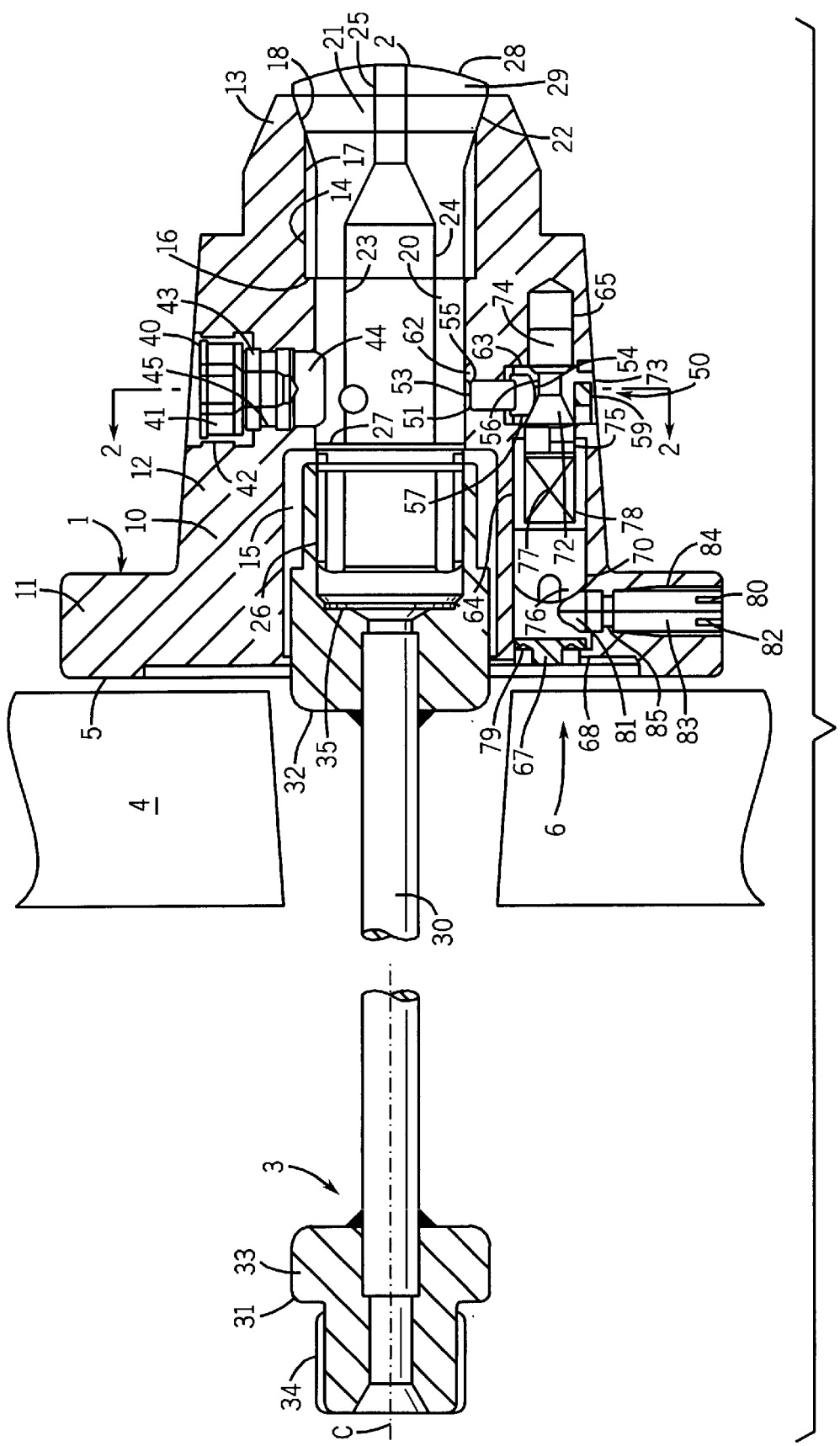
FIG. 1 is a longitudinal section through a collet adaptor assembly in accordance with the invention.

The collet adaptor assembly shown in FIG. 1 comprises a collet adaptor 1, a split collet 2 and a drawbar 3.

The collet adaptor has a body in the form of a hollow arbor 10 having a central longitudinal axis. The arbor 10 is of stepped form having a rear cylindrical flange portion 11 for mounting to the headstock 4 of a rotatable spindle, a slightly tapered intermediate portion 12 and a front nose portion 13. A stepped cylindrical bore 14 extends through tie arbor 10. The bore 14 has a rear bore portion 15 of greater diameter, an intermediate bore portion 16 of lesser diameter and a forward bore portion 17 of slightly greater diameter than the intermediate bore portion 16. The forward bore portion 17 merges at its front end into an outwardly tapered internal surface 18.

The drawbar 3 comprises a flexible elongate intermediate member 30 with threaded adaptors 31, 32 provided at its rear and front ends. The rear adaptor 31 has a forward flange part 33 mounted on the intermediate member 30 and an externally screw-threaded rear end part 34 for connection to a rotary cylinder of the spindle assembly. The front adaptor 32 is of stepped form having a treaded internal bore 35 extending rearwardly from its front end. The front adaptor 32 is received in the rear bore portion 15 of the arbor 10.

The elongate intermediate member 30 may comprise a solid rod or a tube. The intermediate member 30 and adaptors 31, 32 of the drawbar may be formed in one piece. However, in a particularly preferred embodiment, the intermediate member 30 is formed from a length of steel pipe having an outside diameter of about 6 mm and a wall thickness of about 1 mm, with threaded adaptors 31, 32 welded or otherwise mounted onto the rear and front ends of the pipe 30.

The collet 2, has a hollow cylindrical body portion 20 and an enlarged head portion 21 at its front end having a tapered external surface 22. A longitudinal bore 23 extends through the collet 2, the bore 23 having a wider bore portion 24 extending through the cylindrical body portion and a narrow bore portion 25 extending through the head portion 21. The cylindrical body portion 20 has a screw-threaded external surface 26 at its rear end which is adapted to be screwed into the threaded bore 36 in the front adaptor 32 of the drawbar 3.

The collet 2 is adapted to be mounted in the collet arbor 10 by anti-rotation means in the form of a collet key screw 40. The collet key screw 40 has an externally screw-threaded head part 41 received in an internally screw-threaded radial bore 42 in the intermediate portion 12 of the arbor 10, a body part 43 and a key part 44 on the radially inner end of the body part 43 opposite the head part 41. The key part 44 is adapted to be received in a recess or keyway 27 in the external surface of the cylindrical body portion 20 of the collet 2 to prevent any relative rotation of the collet 2 and arbor 10 about the central longitudinal axis A of the collet arbor 10. An O-ring seal 45 is provided in an annular groove in the body part 43.

The tapered head portion 21 of the collet 2 is split and has a plurality of longitudinally extending slits (not shown) in its front end surface 28. The slits extend rearwardly from the front end surface and radially inwardly from the tapered external surface 22 of the head portion 21 to the bore portion 25. Preferably, three slits are provided in the head portion 21 circumferentially spaced around the central longitudinal axis 6 of the collet 2.

In the assembled collet adaptor assembly shown in FIG. 1, the tapered external surface 22 of the head portion 21 of the collet 2 engages the internal tapered surface 18 of the front end portion 13 of the collet arbor 10 so that when a workpiece is inserted into the bore portion 25 of the collet 2 and the drawbar 3 is moved rearwardly relative to the arbor 10, gripping jaws formed by segments 29 of the head portion between the slits clamp onto the workpiece to hold the workpiece securely in the collet 2 which itself is held against any rotational movement relative to the arbor 10 by the collet key screw 40.

A collet assembly such as described above has two different types of runout errors, concentricity and angularity, which separately or in combination, can result in inaccurate machining of a workpiece held by the collect when operated upon by a cutting or grinding tool of the CNC machine.

Errors in concentricity occur when the central longitudinal axis of a clamped workpiece is offset from the central axis of rotation of the rotatable spindle.

Errors in angularity occur when the central longitudinal axis of the clamped workpiece extends at an angle to the central axis of rotation of the rotatable spindle. Such errors are largely influenced by the clearance between the cylindrical body 20 of the collet 2 and the bore in the collet adaptor. Errors in concentricity and angularity can combine to add up to appreciable runout errors. For instance, if the runout of a test workpiece is measured at a point approximately 25 mm from the front face of the collet, (about 100 mm from the front face of the spindle), in conventional collet adaptors having a tapered rear end received in a corresponding tapered recess in the spindle headstock an error in concentricity of about 0.002 mm and an error in angularity of about 0.002 mm can result in a total error of about 0.004 mm.

Figure 2:
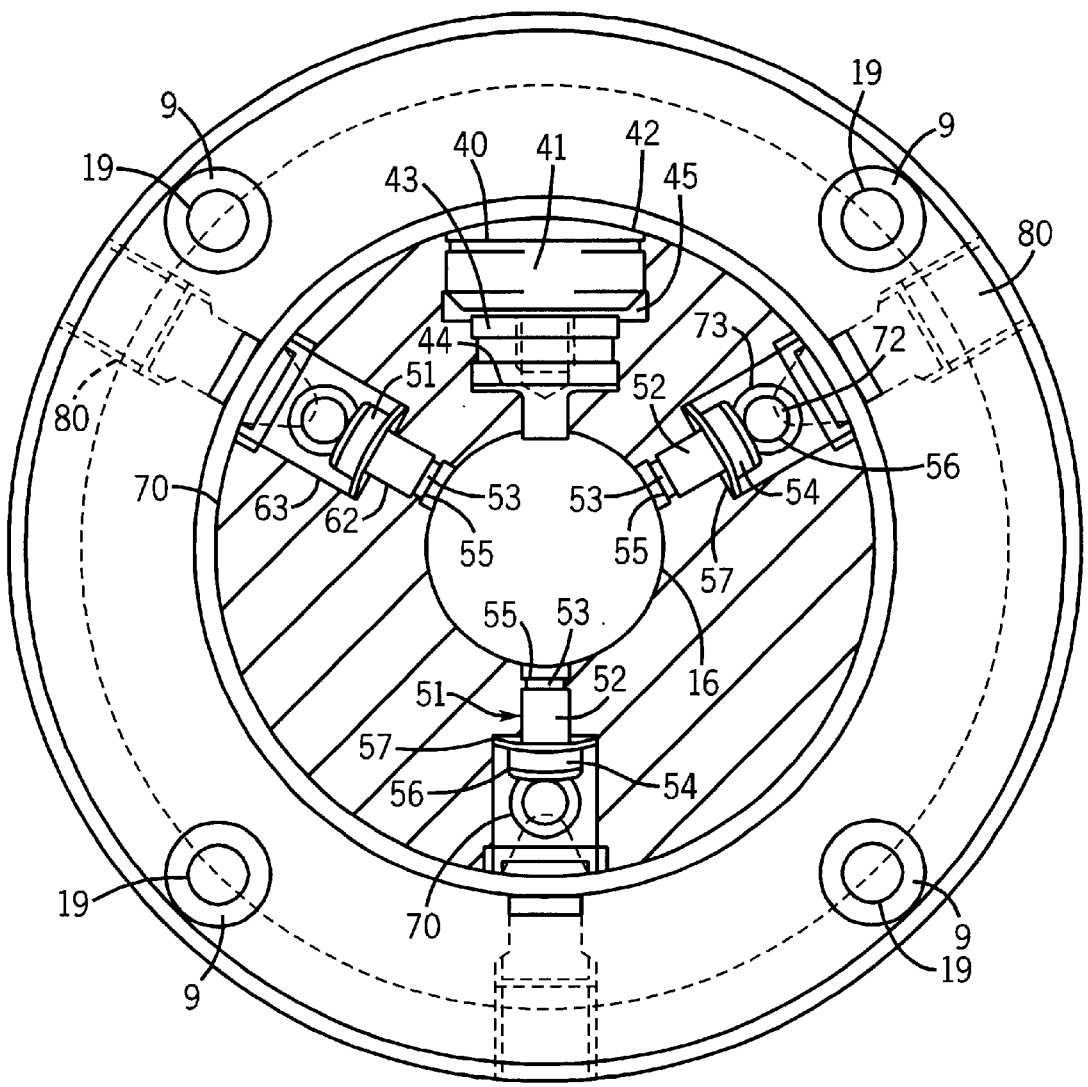
FIG. 2 is a section on the line A—A of FIG. 1.

It has been found that it is possible to correct for errors in concentricity with the collet arbor 10 of FIGS. 1 and 2 which has a rear flange portion 11 having an accurately ground planar rear surface 5 bolted or otherwise secured to a similarly accurately ground planar front face 6 of the spindle headstock 4 instead of the conventional tapered rear end.

As shown in FIG. 2, the collet arbor 10 has four apertures 19 in its rear flange at circumferentially spaced locations around the central axis C of the collet adaptor. Each aperture 19 is adapted to receive a respective mounting bolt 9 for securing the arbor 10 to the front face 5 of the headstock 4. Each aperture 19 is of a slightly greater diameter than the diameter of a respective bolt 9 to permit a slight adjustment of the radial position of the arbor relative to the central axis of rotation of the spindle.

In a preferred method of the invention, errors of concentricity can be substantially reduced with the collet arbor 10 described above by clamping a workpiece with its front end right at the front end or nose of the collet, and zeroing an indicator on the central axis of the clamped workpiece by adjusting the radial position of the arbor 10 mounted on the front face 5 of the spindle headstock 4 by means of the mounting bolts 9. With this method, it is possible to reduce errors in concentricity to about 1.5–2 microns.

One preferred type of indicator which may be zeroed by radial adjustment of the position of the arbor on the spindle face is a Dial Indicator Code No. 2109E as sold by the Miyotoyo company having a graduation of 0.001 mm or similar.

When possible errors in concentricity have been corrected as described above, errors in angularity can then be compensated by using an adjustment mechanism 50 which will now be described.

The adjustment mechanism 50 for compensating for errors in angularity includes a number of adjustment pins 51 radially movable within radial bores 62, 63 in the intermediate portion 12 of the arbor 10. As shown in FIG. 2, three adjustment pins 51 are preferably provided at circumferentially spaced locations around the central axis of the arbor 10, although it will be appreciated that a different number of adjustment pins may be provided.

Each adjustment pin 51 is of stepped cylindrical form having a cylindrical body part 52, a nose part 53 of smaller diameter at the radially inner end of the cylindrical body part 52 and an enlarged head part 54. The radial bores for receiving the adjustment pins are also of stopped form having a radially inner bore section 62 of smaller diameter and a radially outer bore section 63 of larger diameter. The body parts 52 and the nose parts 53 of the adjustment pins 51 are received in the radially inner bore sections 62 and an O-ring 55 is mounted around each nose part 53 within its respective bore section 62. The head parts 54 of the adjustment pins are received in the radially outer bore sections 63. Each head part 54 has a substantially flat surface facing radially inwards and a curved surface 56 facing radially outwards. A disc spring 57 is provided between the flat surface of each head part 54 and a shoulder between the radially inner and outer bore sections 62 and 63. The outer bore sections 63 extend to the external surface of the arbor 10 to allow the adjustment pins 51 to be inserted and, in the assembled adaptor assembly, the radial bores 62, 63 are closed by closure plugs 59.

The adjustment pins 51 are movable in the radial bores 62, 63 into engagement with the cylindrical body portion 20 of the collet 2 at locations circumferentially spaced around the body portion 20 from the collet screw key 40 by means of the adjustment mechanism 50 to provide a very fine micro adjustment of the orientation of the collet 2 within the collet arbor 10 in order to compensate for errors in angularity in a workpiece clamped by the collet 2.

The adjustment mechanism 50 for each adjustment pin 51 includes an elongate longitudinally movable adjustment member 70 and a radially movable adjustment element in the form of a screw 80. The adjustment member 70 is movable in a stepped bore 64, 65 extending longitudinally in the collet arbor 10 in a direction parallel to the central longitudinal axis of the collet arbor 10. The adjustment member 70 has a cam surface 73 on a tapered portion 72 which engages with the curved surface 56 of the head part 54 of a respective adjustment pin 51 in such a manner that longitudinal movement of the adjustment member causes the adjustment pin 51 to move in its radial bore 62, 63. The adjustment member 71 is guided for longitudinal movement in the bore 64, 65 by an enlarged front cylindrical portion 74 at the forward, narrow end of the tapered portion 72, by an intermediate cylindrical portion 75 at the rear, wider end of the tapered portion 72, and by a rear cylindrical portion 76 of larger diameter. The front and intermediate cylindrical portions 74 and 75 are received in a forward bore portion 65 of lesser diameter and the rear cylindrical portion 76 is received in a rear bore portion 64 of greater diameter.

A forward part 77 of the rear cylindrical portion 76 is of slightly less diameter than its rear part. A light compression spring 78 is provided around the forward part 77 with the ends of the spring 78 in engagement with a shoulder between the forward and rear parts of the rear cylindrical portion 76 and a shoulder between the rear and forward bore portions 64 and 65 of the longitudinal bore. The rear bore portion 65 extends to the rear surface 5 of the arbor 10 and is also closed by a closure plug 67.

The rear end of the rear cylindrical portion 76 of the adjustment member 71 has a curved convex surface 79 which is engaged by a tapered nose portion 81 of the radially movable adjustment element 80.

The adjustment screw 80 has an enlarged head portion 82 and a cylindrical portion 83 between the tapered nose portion 81 and the head portion 82. The adjustment element 80 is received in a stepped bore 68 which extends radially in the rear flange portion 11 of the collet arbor. The cylindrical portion 83 has a screw-threaded outer part 84 received in an internally threaded portion of the larger diameter outer part of the radial bore 68, and an O-ring 85 is received in an annular grove in an inner part of the cylindrical portion 83 which is movable in a lesser diameter inner part of the radial bore 68.

It will be appreciated from the foregoing description that movement of the adjustment screws 80 in a radial direction causes a longitudinal movement of the adjustment members 70 which, in turn results in a radial movement of the adjustment pins 51 by the engagement of the cam surfaces 73 with the curved surfaces 56 on the head parts 54 of the adjustment pins 51.

Each of the adjustment pins 51 is adjustable to a very fine degree owing to the nature of the adjustment mechanism 50. Thus, the circumferentially spaced adjustment pins 51 which are engageable with the cylindrical body part 20 of the collet 2 enable very fine micro adjustments of the orientation of the collet 2 relative to the central longitudinal axis C of the collet arbor 10 in order to compensate for errors in angularity which are largely caused by the clearance between the external surface of the cylindrical body part 20 of the collet 2 and the bore section 16 in the arbor 10.

For example, there may be a tolerance of approximately 5 microns (0.005 mm) in the internal diameter of the collet arbor, and a tolerance of 5–10 microns (0.005–0.010 mm) in the external diameter of a collet, giving a resultant clearance of a minimum 5 microns and a maximum 15 microns for an average clearance of 10 microns. With the adjustment device of the arbor of the present invention, however, it is possible to adjust the orientation of the collet to reduce the error in angularity to 2 microns or less when measured at a point approximately 25 mm from the front of the collet A fine micro adjustment of this order would not normally be achievable by other adjustment means, such as grub screws mounted in threaded radial bores in a collet adaptor for engagement with the cylindrical part of a collet.

Another feature of the collet adaptor described above which enables a fine micro adjustment to be achieved is the use of a flexible drawbar, such as the drawbar 3 described above which has a relatively light, flexible intermediate member 30 extending between the threaded adaptors 31, 32. With a heavy, more rigid drawbar, the fine micro adjustment of the orientation of the cylindrical part 20 of the collet 2 within the collet adaptor 2 would not be achievable. A further feature of the present invention which assists in achieving a fine micro adjustment is the use of an anti-rotation collet screw key 40 having a key part 44 made of soft mild steel. Conventional collet screw keys with a key part or "dog point" made of hardened steel can cause a deformation on either side of the collet keyway 27 of the order of 5–6 microns. Also, the common practice of screwing the collet 2 into the threaded adaptor 32 in the arbor 10 and then feeling the keyway 27 with the anti-rotation screw key 40 can also throw up annular marks on the collet to reduce its ultimate accuracy. These possible sources of error can be reduced by the use of the sot mild steel anti-rotation key.

The present invention therefore provides an improved collet adaptor arbor and method which can compensate effectively for runout errors in angularity and concentricity.

It will be appreciated that various modifications and alterations may be made to the preferred embodiment described above, without departing from the scope and spirit of the present invention.

What is claimed is:

1. A collet adaptor for a split, draw-back collet having a cylindrical part for mounting in the collet adaptor and a tapered split part as its front end for gripping a workpiece, the collet adaptor comprising:

a body with a cylindrical bore for receiving the cylindrical part of the collet and tapered surface at the front end of the adaptor for engagement with the tapered, split part of the collet; and anti-rotation means for preventing rotation of the collet relative to the collet adaptor;

wherein the collet adaptor includes a plurality of adjustment pins directly engageable with the cylindrical part of the collet at circumferentially spaced locations around the collet to provide a fine adjustment of the angle of the central longitudinal axis of the collet relative to the central longitudinal axis of the collet adaptor.

2. A collet adaptor according to claim 1, wherein the adjustment pins are spring-loaded and movable in a substantially radial direction relative to the central longitudinal axis of the collet adaptor.

3. A collet adaptor according to claim 2, wherein each adjustment pin has an enlarged head with a curved surface engaged by a cam surface of a respective elongate adjustment member which is movable relative to the collet adaptor in a longitudinal direction substantially parallel to the central longitudinal axis of the collet adaptor.

4. A collet adaptor according to claim 3, wherein each elongate adjustment member has a curved end portion engaged by a tapered surface on a respective adjustable element.

5. A collet adaptor according to claim 4, wherein each adjustable element comprises an adjustment screw which is radially movable relative to the central longitudinal axis of the collet adaptor.

6. A collet adaptor according to claim 1, wherein the body of the collet adaptor has a recess in its rear end receiving the front end portion of a drawbar to which the rear part of the collet is attachable.

7. A collet adaptor according to claim 6, wherein the drawbar has enlarged front end and rear end portions and a flexible elongate intermediate portion between the front and rear end portions.

8. A collet adaptor according to claim 7, wherein the enlarged front end portion of the drawbar has an internally screw-threaded bore engageable with an externally screw-threaded rear end portion of the collet.

9. A collet adaptor according to claim 1, wherein the anti-rotation means comprises:

a collet key screw received in a radial bore in the body of the collet adaptor, the key screw having a key part received in a recess or keyway in the cylindrical surface of the collet.

10. A collet adaptor according to claim 9, wherein the key part of the collet key screw is made of soft mild steel.

11. A collet adaptor according to claim 1, wherein the body of the collet adaptor has an accurately ground planar rear face.

12. A collet adaptor for a split, draw-back collet having a cylindrical part for mounting in the collet adaptor and a tapered split part as its front end for gripping a workpiece, the collet adaptor comprising:

a body with a cylindrical bore for receiving the cylindrical part of the collet and tapered surface at the front end of the adaptor for engagement with the tapered, split part of the collet; and anti-rotation means for preventing rotation of the collet relative to the collet adaptor;

wherein the collet adaptor includes a plurality of adjustment pins engageable with the cylindrical part of the collet at circumferentially spaced locations around the collet to provide a fine adjustment of the angle of the central longitudinal axis of the collet relative to the central longitudinal axis of the collet adaptor; and wherein the body of the collet adaptor has an accurately ground planar rear face, and a rear flange with a plurality of apertures extending therethrough for receiving mounting bolts for securing the body of the collet adaptor to the planar front face of a spindle headstock.

13. A collet adaptor according to claim 12, wherein the apertures in the flange of the collet adaptor are of slightly greater diameter than the diameter of the mounting bolts to permit a slight adjustment of the radial position of the collet adaptor relative to the central axis of rotation of the spindle headstock.

14. A collet adaptor for a split, draw-back collet having a cylindrical part for mounting in the collet adaptor and a tapered split part as its front end for gripping a workpiece, the collet adaptor comprising:

a body with a cylindrical bore for receiving the cylindrical part of the collet and tapered surface at the front end of the adaptor for engagement with the tapered, split part of the collet; and anti-rotation means for preventing rotation of the collet relative to the collet adaptor;

said collet adaptor including a plurality of adjustment pins engageable with the cylindrical part of the collet at circumferentially spaced locations around the collet to provide a fine adjustment of the angle of the central longitudinal axis of the collet relative to the central longitudinal axis of the collet adaptor, said adjustment pins being movable in a substantially radial direction relative to the central longitudinal axis of the collet adaptor, each adjustment pin having a head with a curved surface engaged by a cam surface of a respective elongate adjustment member which is movable relative to the collet adaptor in a longitudinal direction substantially parallel to the central longitudinal axis of the collet adaptor.

15. A collet adaptor according to claim 14, wherein each elongate adjustment member has a curved end portion engaged by a tapered surface on a respective adjustable element.

16. A collet adaptor according to claim 15, wherein each adjustable element comprises an adjustment screw which is radially movable relative to the central longitudinal axis of the collet adaptor.

17. A method of compensating for runout errors in a CNC machine having a spindle rotatable about its central longitudinal axis, a collet adaptor, and a split draw-back collet having a cylindrical part mounted in the collet adaptor and a tapered split part at its front end for gripping a workpiece, said method including:

providing the collet adaptor with an accurately ground planar rear surface, and internal tapered surface at its front end, a cylindrical bore to receive the cylindrical part of a collet, anti-rotation means to prevent rotation of the collet relative to the adaptor, and a plurality of adjustment pins engageable with the cylindrical part of the collet;

mounting the collet adaptor and collet to the headstock of a rotatable spindle with the planar rear surface of the collet adaptor adjacent an accurately ground front surface of the spindle headstock;

clamping a workpiece in the collet;

adjusting the radial position of the collet adaptor and collet relative to the central longitudinal axis of the spindle to compensate for errors in concentricity between the central longitudinal axis of the spindle and the central longitudinal axis of the internal tapered surface of the collet adaptor; and adjusting one or more of said adjustment pins to compensate for errors in angularity between the central longitudinal axis of the workpiece clamped by the collet and the central longitudinal axis of the spindle, wherein the collet adaptor mounted to the spindle headstock by mounting bolts which extend through apertures in a rear flange of the collet adaptor, the apertures being of slightly larger diameter than the mounting bolts to permit the adjustment of the radial position of the collet adaptor relative to the central longitudinal axis of the spindle.

18. A method according to claim 17, wherein an indicator on the central axis of the clamped workpiece is zeroed by adjusting the radial position of the collet adaptor to compensate for errors in concentricity.

19. A method according to claim 17, wherein each adjustment pin is movable in a substantially radial direction relative to the central longitudinal axis of the collet adaptor.

20. A method according to claim 19, wherein each adjustment pin has an enlarged head with a curved surface engaged by a cam surface of a respective elongate adjustment member which is movable relative to the body of the collet adaptor in a longitudinal direction substantially parallel to the central axis of the collet adaptor to cause movement of a respective adjustment pin.

21. A method according to claim 20, wherein each elongate adjustment member has a curved end portion which is engaged by a tapered surface on a respective adjustable element, movement of the adjustable element causing the adjustment member to move to adjust radial position of the respective adjustment pin.

22. A method according to claim 21, wherein each adjustable element is movable in a substantially radial direction relative to the central longitudinal axis of the collet adaptor.

* * * * *